(12) United States Patent
Yao et al.

(10) Patent No.: US 11,621,621 B2
(45) Date of Patent: Apr. 4, 2023

(54) MAGNETS, POLE SHOES, AND SLOT OPENINGS OF AXIAL FLUX MOTOR

(71) Applicant: GM GLOBAL TECHNOLOGY OPERATIONS LLC, Detroit, MI (US)

(72) Inventors: Jian Yao, Shanghai (CN); Chengwu Duan, Shanghai (CN); Yusheng Zou, Northville, MI (US); Alireza Fatemi, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 235 days.

(21) Appl. No.: 17/081,390

(22) Filed: Oct. 27, 2020

(65) Prior Publication Data
US 2021/0288569 A1 Sep. 16, 2021

(30) Foreign Application Priority Data
Mar. 13, 2020 (CN) .......................... 202010175971.5

(51) Int. Cl.
*H02K 21/24* (2006.01)
*H02K 1/2793* (2022.01)
*H02K 1/14* (2006.01)

(52) U.S. Cl.
CPC .............. *H02K 21/24* (2013.01); *H02K 1/146* (2013.01); *H02K 1/2793* (2013.01)

(58) Field of Classification Search
CPC ........ H02K 21/24; H02K 1/146; H02K 1/182; H02K 1/2793; H02K 2201/06
USPC .......................... 310/156.32, 156.33, 216.098
See application file for complete search history.

(56) References Cited

U.S. PATENT DOCUMENTS

| | | | | |
|---|---|---|---|---|
| 2005/0140244 A1* | 6/2005 | Yamada | ................ | H02K 29/03 310/268 |
| 2011/0234037 A1* | 9/2011 | Petro | ....................... | H02K 1/14 310/156.38 |
| 2011/0309694 A1* | 12/2011 | Woolmer | ............... | H02K 21/24 310/44 |
| 2012/0126653 A1* | 5/2012 | Yang | ..................... | H02K 1/146 310/156.32 |
| 2018/0219441 A1* | 8/2018 | Thiele | ..................... | H02K 1/14 |
| 2018/0219442 A1* | 8/2018 | Heins | ..................... | H02K 1/148 |
| 2021/0288554 A1 | 9/2021 | Yao et al. | | |
| 2022/0166268 A1 | 5/2022 | Duan et al. | | |

OTHER PUBLICATIONS

U.S. Appl. No. 16/426,797, filed May 30, 2019, Yao et al.
U.S. Appl. No. 16/426,807, filed May 30, 2019, Yao et al.
U.S. Appl. No. 16/779,788, filed Feb. 3, 2020, Yao et al.
U.S. Appl. No. 16/785,106, filed Feb. 7, 2020, Yao et al.
U.S. Appl. No. 16/785,121, filed Feb. 7, 2020, Yao et al.

* cited by examiner

*Primary Examiner* — Michael Andrews

(57) ABSTRACT

An axial flux motor includes: a stator having a first side and a second side opposite the first side, the stator including: N stator core components on the first side, where N is an integer greater than two; and pole shoes attached to radial sides of the N stator core components, N slot openings between adjacent ones of the pole shoes, where each of the N slot openings extends in at least one direction non-radially on the first side; and a rotor including a third side and M permanent magnets on the third side, where the first side is parallel to the third side, and where M is an integer greater than two.

19 Claims, 16 Drawing Sheets

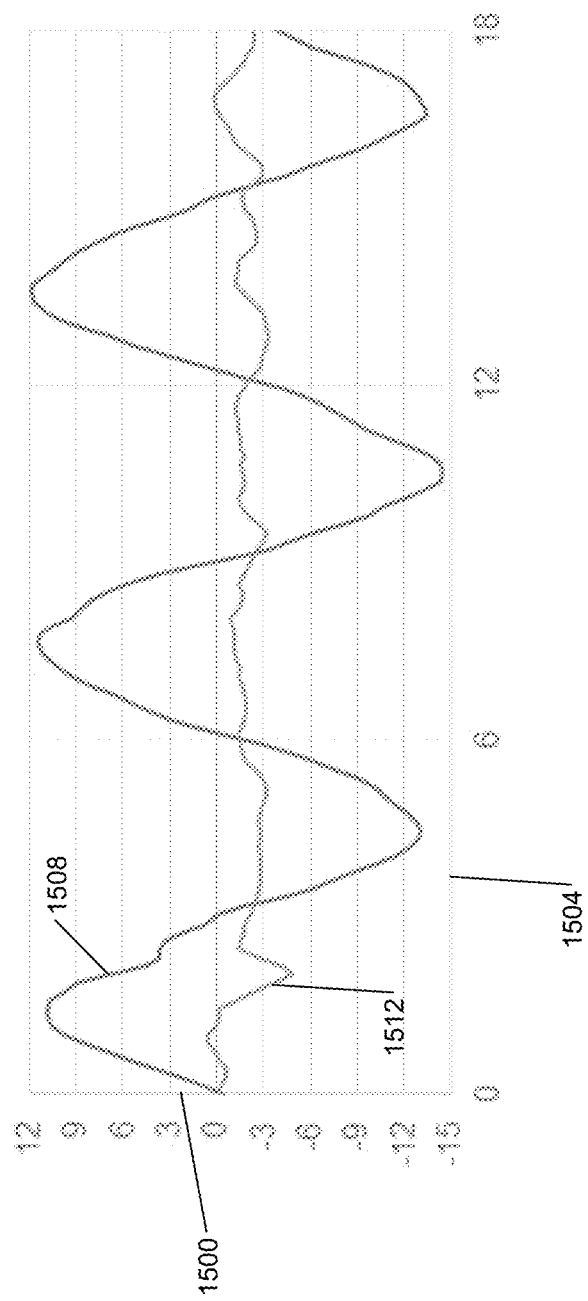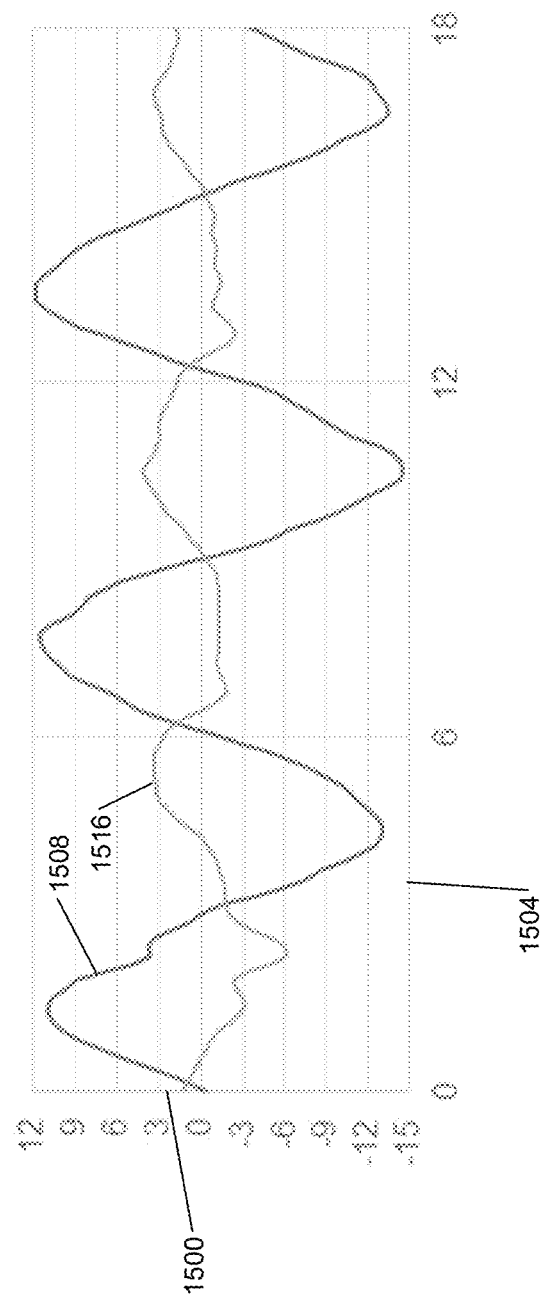
FIG. 15

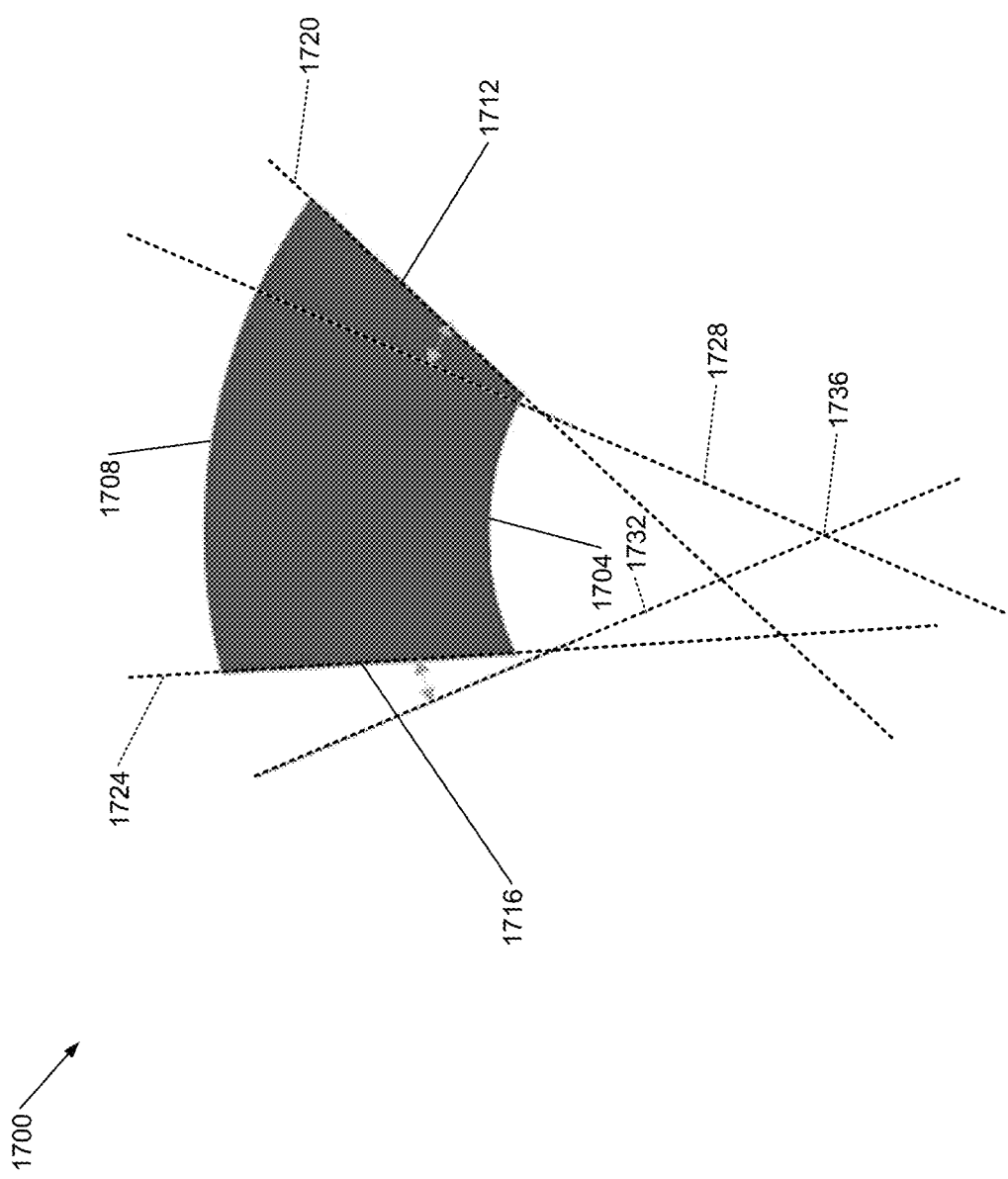

MAGNETS, POLE SHOES, AND SLOT OPENINGS OF AXIAL FLUX MOTOR

CROSS-REFERENCE TO RELATED APPLICATIONS

This application claims the benefit of Chinese Patent Application No. 202010175971.5, filed on Mar. 13, 2020. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric motors and more particularly to slot openings of stator cores of electric motors.

Electric motors convert electrical energy into mechanical work by the production of torque, while electric generators convert mechanical work to electrical energy. Electric vehicles, including hybrid vehicles, include electric motors/generators, such as induction motors and permanent magnet motors, to propel the vehicles, as well as to capture braking energy when acting as an electric generator. Motors will be referred to herein; however, it will be understood that such principles also equally apply to generators. Generally, the electric motor includes a rotor that rotates during operation and a stator that is stationary. The rotor may contain a plurality of permanent magnets and rotates relative to the fixed stator. The rotor is connected to a rotor shaft that also rotates with the rotor. The rotor, including the permanent magnets, is separated from the stator by a predetermined air gap. The stator includes conductors in the form of wire windings. When electrical energy is applied through the conductive wire windings, a magnetic field is generated. When electric energy is fed into the conductive windings of the stator, the power can be transferred over the air gap by a magnetic flux creating torque that acts on the permanent magnets in the rotor. In this manner, mechanical power can be transferred to the rotating rotor shaft. In an electric vehicle, the rotor thus transmits torque via the rotating shaft through a gear set to the drive wheels of the vehicle.

Two types of electric motors include radial flux and axial flux type motors. In a radial flux motor, the rotor and stator are typically situated in a concentric or nested configuration, so that when a stator is energized, it creates a magnetic flux that extends radially from the stator to the rotor. Thus, the conductive windings in the stator are typically arranged parallel to an axis of rotation so that a magnetic field is generated that is oriented in the radial direction from the axis of rotation (along the rotor shaft). In an axial flux motor, a magnetic field parallel to an axis of rotation is produced by the electrically conductive wire windings in the stator, so the magnetic flux extends parallel to an axis of rotation (parallel to the rotor shaft). In certain applications, axial flux motors are desirable because they are relatively lightweight, generate increased power, and have a compact size as compared to radial flux motors.

SUMMARY

In a feature, an axial flux motor includes: a stator having a first side and a second side opposite the first side, the stator including: N stator core components on the first side, where N is an integer greater than two; and pole shoes attached to radial sides of the N stator core components, N slot openings between adjacent ones of the pole shoes, where each of the N slot openings extends in at least one direction non-radially on the first side; and a rotor including a third side and M permanent magnets on the third side, where the first side is parallel to the third side, and where M is an integer greater than two.

In further features, at least one recess is formed in each of the N stator core components.

In further features, the at least one recess extends non-radially on the first side.

In further features, the at least one recess includes at least two recesses formed in each of the N stator core components.

In further features, an electrically insulative material is located in each of the one or more recesses formed in each of the N stator core components.

In further features, an air gap is disposed between the N stator core components and the permanent magnets.

In further features, electrical conductors are at least one of (i) wound around the N stator core components and (ii) wound through the N stator core components.

In further features, the N stator core components are made of a soft magnetic composite (SMC) material.

In further features, the pole shoes are made of a soft magnetic composite (SMC) material.

In further features, the pole shoes are adhered to the N stator core components, respectively, via at least one of an adhesive and powder metallurgy forming.

In further features, ones of the pole shoes include: a first arcuate surface; a second arcuate surface that is located radially outwardly of the first arcuate surface; a first side surface that connects first ends of the first and second arcuate surfaces and that extends in at least one direction non-radially on the first side; and a second side surface that connects second ends of the first and second arcuate surfaces and that extends in at least one direction non-radially on the first side.

In further features, each of the M permanent magnets includes: a first arcuate surface; a second arcuate surface that is located radially outwardly of the first arcuate surface; and at least one of: a third side surface that connects first ends of the first and second arcuate surfaces and that extends in at least one direction non-radially on the third side of the rotor; and a fourth side surface that connects second ends of the first and second arcuate surfaces and that extends in at least one direction non-radially on the third side of the rotor.

In further features, each of the M permanent magnets includes both: the third side surface that connects the first ends of the first and second arcuate surfaces and that extends in at least one direction non-radially on the third side of the rotor; and the fourth side surface that connects the second ends of the first and second arcuate surfaces and that extends in at least one direction non-radially on the third side of the rotor.

In further features, each of the M permanent magnets includes: a first arcuate surface; a second arcuate surface that is located radially outwardly of the first arcuate surface; a third side surface that extends radially outwardly from a first end of the first arcuate surface in a first direction; a fourth side surface that extends radially outwardly in a second direction to a first end of the second arcuate surface; a fifth side surface that connects the third side surface and the fourth side surface; a sixth side surface that extends radially outwardly from a second end of the first arcuate surface in a third direction; a seventh side surface that extends radially outwardly in a fourth direction to a second end of the second arcuate surface; and an eighth side surface that connects the sixth side surface and the seventh side surface, where the first, second, third, and fourth directions are different from each other.

In further features, the fifth side surface is perpendicular to both the third and fourth side surfaces.

In further features, the eighth side surface is perpendicular to both the sixth and seventh side surfaces.

In further features: the fifth side surface forms an oblique angle with the third and fourth side surfaces; and the eighth side surface forms an oblique angle with the sixth and seventh side surfaces.

In a feature, an axial flux motor includes: a stator having a first side and a second side opposite the first side, the stator including: N stator core components on the first side, where N is an integer greater than two; and pole shoe attached to sides of the N stator core components; N slot openings between adjacent ones of the pole shoes; and a rotor including a third side and M permanent magnets on the third side, where the first side is parallel to the third side, and where M is an integer greater than two, and where each of the M permanent magnets includes: a first arcuate surface; a second arcuate surface that is located radially outwardly of the first arcuate surface; and at least one of: a third side surface that connects first ends of the first and second arcuate surfaces and that extends in at least one direction non-radially on the third side of the rotor; and a fourth side surface that connects second ends of the first and second arcuate surfaces and that extends in at least one direction non-radially on the third side of the rotor.

In further features, each of the M permanent magnets includes both: the third side surface that connects the first ends of the first and second arcuate surfaces and that extends in at least one direction non-radially on the third side of the rotor; and the fourth side surface that connects the second ends of the first and second arcuate surfaces and that extends in at least one direction non-radially on the third side of the rotor.

In a feature, an axial flux motor includes: a stator having a first side and a second side opposite the first side, the stator including: N stator core components on the first side, where N is an integer greater than two; and pole shoes attached to sides of the N stator core components; N slot openings between adjacent ones of the pole shoes; and a rotor including a third side and M permanent magnets on the third side, where the first side is parallel to the third side, and where M is an integer greater than two, and where each of the M permanent magnets includes: a first arcuate surface; a second arcuate surface that is located radially outwardly of the first arcuate surface; a third side surface that extends radially outwardly from a first end of the first arcuate surface in a first direction; a fourth side surface that extends radially outwardly in a second direction to a first end of the second arcuate surface; a fifth surface that connects the third side surface and the fourth side surface; a sixth side surface that extends radially outwardly from a second end of the first arcuate surface in a third direction; a seventh side surface that extends radially outwardly in a fourth direction to a second end of the second arcuate surface; and an eighth surface that connects the sixth side surface and the seventh side surface, where the first, second, third, and fourth directions are different from each other.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 15 includes example graphs of cogging torque versus rotor position during rotation of a rotor;

FIGS. 16 and 17 includes perspective views of a permanent magnet of a rotor.

In the drawings, reference numbers may be reused to identify similar and/or identical elements.

DETAILED DESCRIPTION

The present application involves stator and rotor components for axial flux motors. The concepts apply not only to electric axial flux motors that generate mechanical energy from electrical energy, but also to axial flux generators that can generate electrical energy from mechanical energy.

Teeth of a stator define slots between adjacent ones of the teeth. Windings are inserted in the slots and wound around the teeth. The teeth may have identical shapes, and the shapes of the teeth may be such that the slots between adjacent teeth extend radially. Pole shoes may be added on the sides of the teeth to reduce the widths of slot openings, so as to concentrate more magnet flux paths through the teeth and therefore improve motor performance. Pole shoes may also have identical shapes, and the shapes of the pole shoes may be such that the slot openings between adjacent pole shoes extended radially. To summarize, the teeth define the slots between the adjacent ones of the teeth with windings inserted and wrapped around the teeth. The pole shoes define the slot opening between the adjacent ones. So, the slot opening is end portion of slot which is close to the air gap surface. With such an arrangement of teeth, pole shoes, slots, and slot openings, however, cogging torque may vary as the motor rotates.

The present application involves slot openings that extend in at least one direction non-radially to decrease changes in cogging torque of the electric motor. Additionally or alternatively, the present application involves permanent magnets of a rotor having non-traditional shapes to reduce cogging torque.

Figure 1:
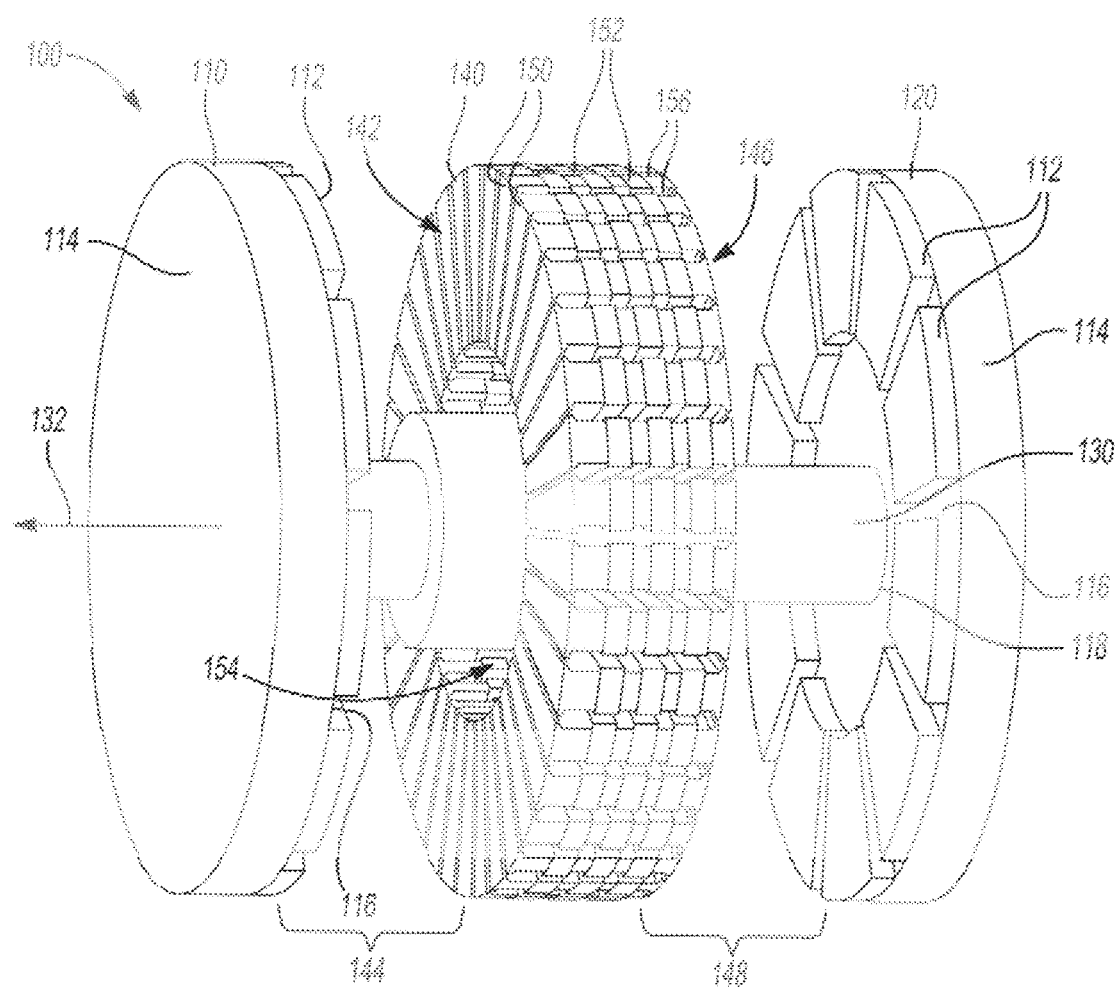
FIG. 1 shows an example axial flux motor having one stator and two rotors.

An exploded view of non-limiting example of an (electric) axial flux motor 100, also known as a pancake motor, is shown in FIG. 1. The axial flux motor 100 may be used, for example, in a vehicle or in another suitable type of device. In a vehicle, the motor 100 may be used, for example, to generate torque that can be transferred to one or more wheels of the vehicle and/or to convert kinetic energy from the one or more wheels into electrical energy (e.g., for regeneration).

The motor 100 includes a first rotor 110 and a second rotor 120 both connected to and configured to rotate about a rotor shaft 130. Both the first and second rotors 110 and 120 have an annular or disk shape with a centrally disposed aperture 118. The rotor shaft 130 passes through the centrally disposed aperture 118. The rotor shaft 130 defines a rotational axis 132 about which the rotors 110 and 120 turn.

A stator 140 is disposed between the first rotor 110 and the second rotor 120. The stator 140 may have an annular or disk shape. The stator 140 is fixed and stationary, while the first and second rotors 110 and 120 rotate during operation with the rotor shaft 130. A side of the first rotor 110 faces a first side 142 of the stator 140 and defines a first air gap 144 therebetween. The first side 142 of the stator 140 resides along a first plane. A side of the second rotor 120 faces a second side 146 of the stator 140 and defines a second air gap 148 therebetween. The second side 146 of the stator 140 resides along a second plane. The first and second planes are parallel and do not intersect.

While the motor 100 is shown to have the one stator and two rotors, the present application is also applicable to other numbers of stators and/or rotors including multiple stators, a single rotor, or more than two rotors. For example, the present application is also applicable to motors with single-rotor motors, motors with a single-stator, motors with a single-rotor between two stators, and motors with one-stator between two rotors. The ensuing description also applies to these other embodiments. While not shown, the motor 100 includes a housing, and the rotor(s), stator(s), and rotor shaft are disposed within the housing. The rotor shaft 130 typically extends through an aperture in the housing to outside of the housing. The housing may be fixed, for example, to a vehicle frame and the rotor shaft may be coupled to a gearbox, for example a reduction gearbox, within the vehicle.

The first rotor 110 and the second rotor 120 can have the same design or a similar design (facing in opposite directions towards the stator 140) and thus the common components will be described herein.

Each of the first rotor 110 and second rotor 120 includes a plurality of permanent magnets 112 affixed to a rotor body 114. The permanent magnets 112 may have alternating polarity. For example, one of the permanent magnets 112 may have a positive polarity, a next adjacent one of the permanent magnets 112 may have a negative polarity, a next adjacent one of the permanent magnets 112 may have a positive polarity, etc. The permanent magnets 112 are separated from one another by channels, such as channel 116. The channels may extend radially along a face of the respective rotor. The permanent magnets 112 and the channel 116 may together define a plurality of magnetic poles.

The stator 140 includes a plurality of stator segments or core components 150 about (around) which a plurality of electrically conductive windings 152 are wrapped (wound). The stator core components 150 may also be referred to as teeth. The stator 140 defines a plurality of slots 156 between the stator core components 150. Conductive windings 152 may extend over or bridge the slots 156. The stator 140 may be fixed and stationary. While an example winding configuration is shown, the present application is also applicable to other winding configurations. For example, in certain aspects, the slots 156 may be configured to receive the electrically conductive windings 152, which are wound in and through the slots 156. The conductive wire or windings 152 may include, for example, copper, copper alloys, or another type of electrical conductor.

The rotor shaft 130 may pass through a centrally disposed aperture 154 in the stator 140 and be supported by one or more bearings that align the first and second rotors 110 and 120 with respect to the stator 140 while allowing rotation of the rotor shaft 130. The electrically conductive windings 152 of the stator 140 may be formed of copper or other conductive wires configured to generate a magnetic field when current is applied so as to interact with magnetic fields of the plurality of permanent magnets 112 having alternating polarities located on the first and second rotors 110 and 120.

Different regions of the stator 140 may be selectively energized to impart a rotational force on the first and second rotors 110 and 120 causing the rotors 110 and 120 and the rotor shaft 130 to rotate with respect to the rotational axis 132. For example, the stator components 150 may be energized sequentially in a counterclockwise direction or a clockwise direction to impart rotation of the rotor shaft 130 clockwise or counterclockwise.

The motor 100 having a single stator 140 and first and second rotors 110, 120 may be used in high torque applications, including for use in an electric or hybrid vehicle. In such implementations, a housing encasing the motor 100 may be fixed/attached to the vehicle frame and at least one output from an end of the rotor shaft 130 is coupled to a reduction gearbox or directly to the vehicle drive wheels. While the example of the motor 100 being implemented in a vehicle is provided, the present application is not limited to vehicle based examples.

Figure 2:
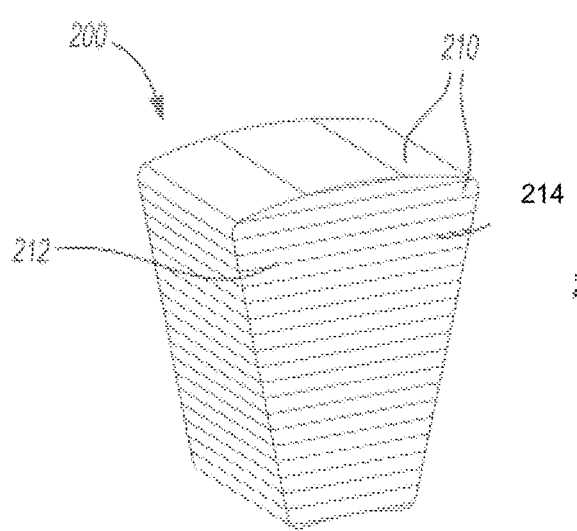
FIG. 2 shows a laminated stator core component including a plurality of laminated layers.
Figure 3:
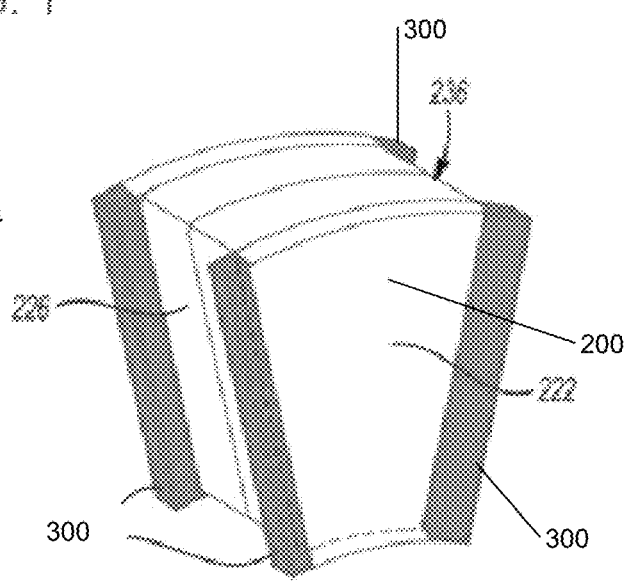
FIG. 3 shows a stator core component.
Figure 4:
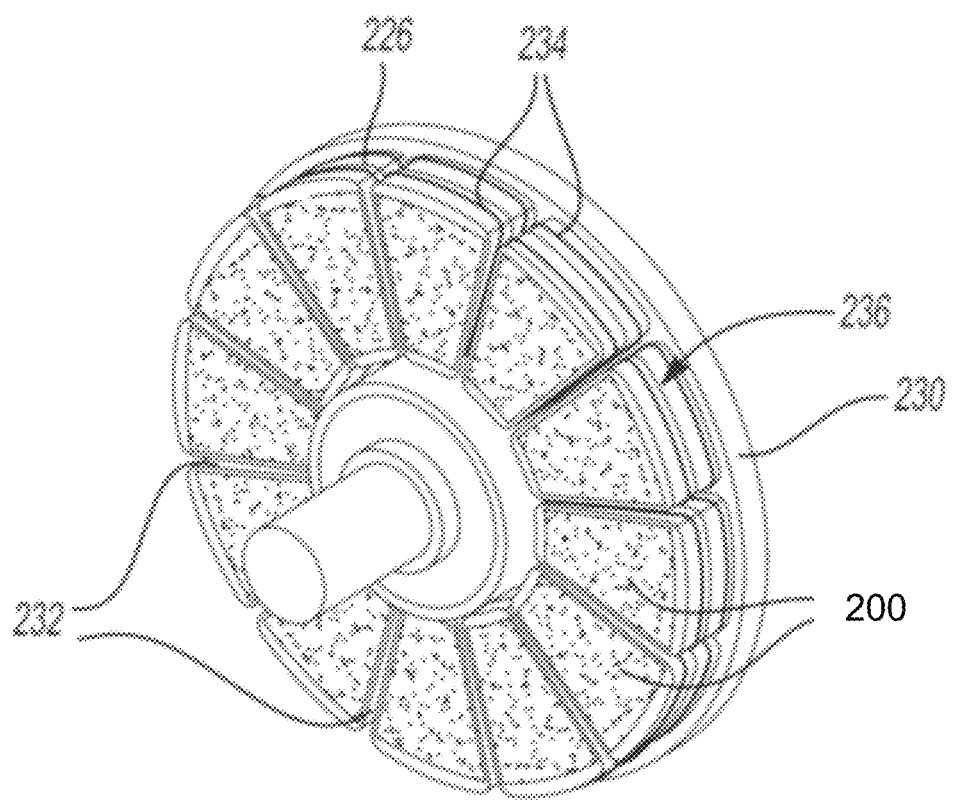
FIG. 4 shows a stator having a plurality of stator core components like that described in FIG. 3.

FIGS. 2-4 show stator core components that can be used in a stator of an axial flux motor, such as the stator 140 of FIG. 1. Conductive wires are disposed or wrapped around an exterior of the stator.

FIG. 2 shows a laminated stator core component 200 having a plurality of layers 210 of magnetic material, such as a ferromagnetic material like magnetic steel or another type of ferromagnetic material. Such magnetic material layers may be isolated from one another by an insulating material interleaved between the layers of the magnetic material. The laminated steel sheets may be punched, optionally annealed, and stacked in a manufacturing process to form a laminated stator core component. When multiple laminated stator core components are assembled together, they form a plurality of magnetizable poles.

As can be seen, the stator core component 200 may include an assembly of multiple distinct laminated layer structures or modules, which may have distinct orientations with respect to one another. In other aspects, the multiple laminated modules may have substantially the same orientation with respect to one another. While not shown in FIG. 2, each pole defined by a stator core component may have an electrically conductive wire at least partially disposed or wrapped around it. Such a laminated stator core component may have the advantage of reducing eddy currents and minimizing hysteresis when incorporated into the stator of an axial flux motor. While FIGS. 2 and 3 show an example shape of a stator core component, the present application involves more complex stator core component shapes, as discussed further below.

As can be seen in FIG. 2, a first layer 212 has a first size defined by its length, width, and height (e.g., thickness), while a second layer 214 in the stack has a second size defined by its length, width, and height (e.g., thickness). The second size of the second layer 214 is necessarily smaller than the first size of the first layer 212 due to the substantially trapezoidal shape of stator core component 200.

Another option for forming the stator core components is shown in FIGS. 3-4, where the stator core component 200 is formed from a soft magnetic composite (SMC) material 222. SMC powders may include a soft magnetic material, the surface of which may be covered with an electrically insulating layer. These powders may be consolidated to form soft-magnetic components, for example, by pressing or another manner of consolidation. While the example of the stator core component 200 having trapezoidal faces with a thickness between the trapezoidal faces is provided, the stator core component 200 can have another suitable shape. Each stator core component 200 includes a trapezoidal tooth 236 and pole shoes 300 that extend outwardly from opposite sides of the stator core component. The pole shoes 300 may be attached, for example, by powder metallurgy forming or another suitable form of attachment. The pole shoes 300 may form one or more flanges. The pole shoes 300, together with the tooth 236, define recessed regions 226. The regions 226 are slots, and each slot has two slot openings at its two ends in axial direction defined by pole shoes 300. The pole shoes 300 define slot openings between adjacent pole shoes on adjacent stator core components. While one example pole shoe shape is shown in FIG. 3, the present application involves other pole shoe shapes, as discussed further below.

FIG. 4 shows a plurality of stator core components 200 circumferentially assembled on a stator disc 230. Channels (slots) 232 are defined between the stator core components 200. As shown in FIG. 4, the recessed regions 226 are configured to receive at least one electrically conductive wire or winding 234 disposed therein (e.g., by being wrapped about at least a portion of an exterior 236 of the stator core component 200). The slot openings are defined between pole shoes 300 on the opposite sides of teeth 236. The stator core component 200 formed of the SMC material 222 can be manufactured into a variety of complex shapes. Therefore, different shapes of slot openings can be realized by changing the shapes of pole shoes 300, as discussed further below.

Figure 5:
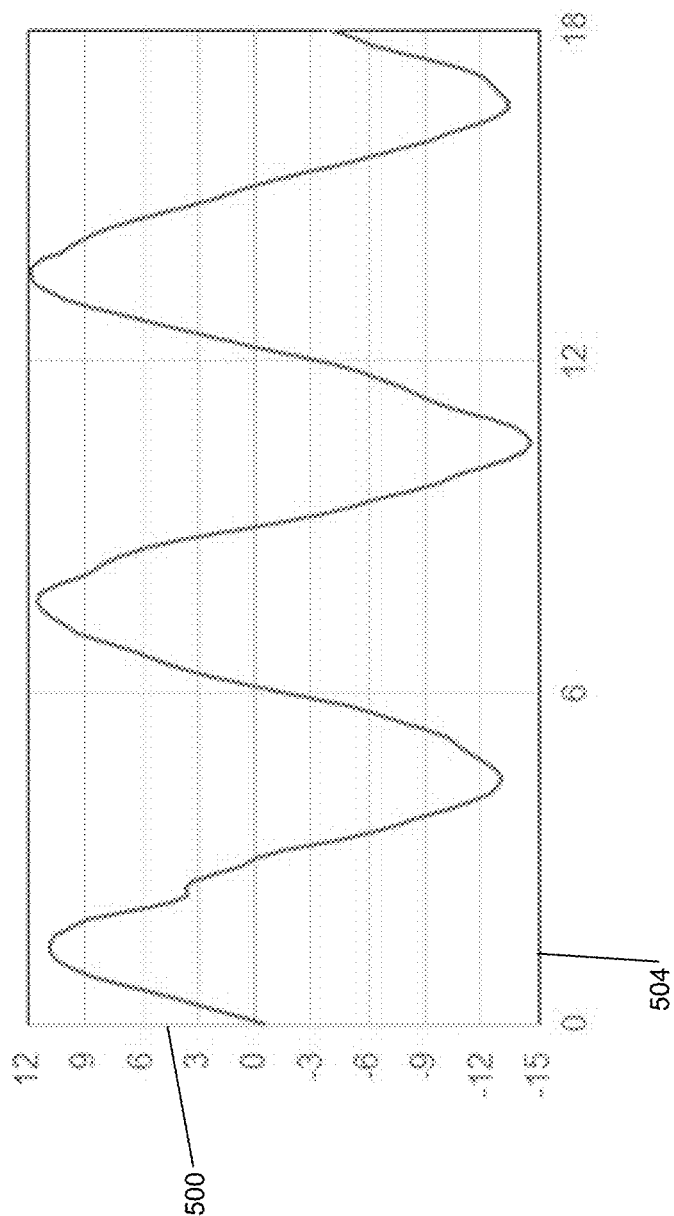
FIG. 5 includes an example graph of cogging torque versus rotor position during rotation of a rotor having stator core components and pole shoes similar to that of FIG. 3.

FIG. 5 includes an example graph of cogging torque (in Newton meters, Nm) 500 versus rotor position 504 during rotation of a rotor having stator core components and pole shoes similar to that of FIG. 3. The cogging torque is introduced by magnetic flux switching from one tooth to the next tooth and passing through the slot openings as the permanent magnets of the rotor(s) rotate. As shown in FIG. 5, the peak-to-peak ripple in the cogging torque is approximately 25 Nm.

According to the present disclosure, the pole shoes attached to the stator core components are shaped such that the slot openings between adjacent pole shoes of different stator core components extend in non-radial directions. In other words, the slot openings extend form non-zero (oblique) angles with respect to all radii of the stator. In other words, the slot openings extend in at least one direction non-radially. The radii of the stator are perpendicular to the rotor axis and extend radially outwardly from a center of the aperture 154 on the plane of that face of the stator. In various implementations, as discussed further below, the stator core components may optionally include one or more recesses having the same shape as the slot openings to form quasi (dummy) slots. The pole shoes may be made, for example, of the SMC material. The pole shoes may be, for example, pressed and punched into shape.

Figure 6:
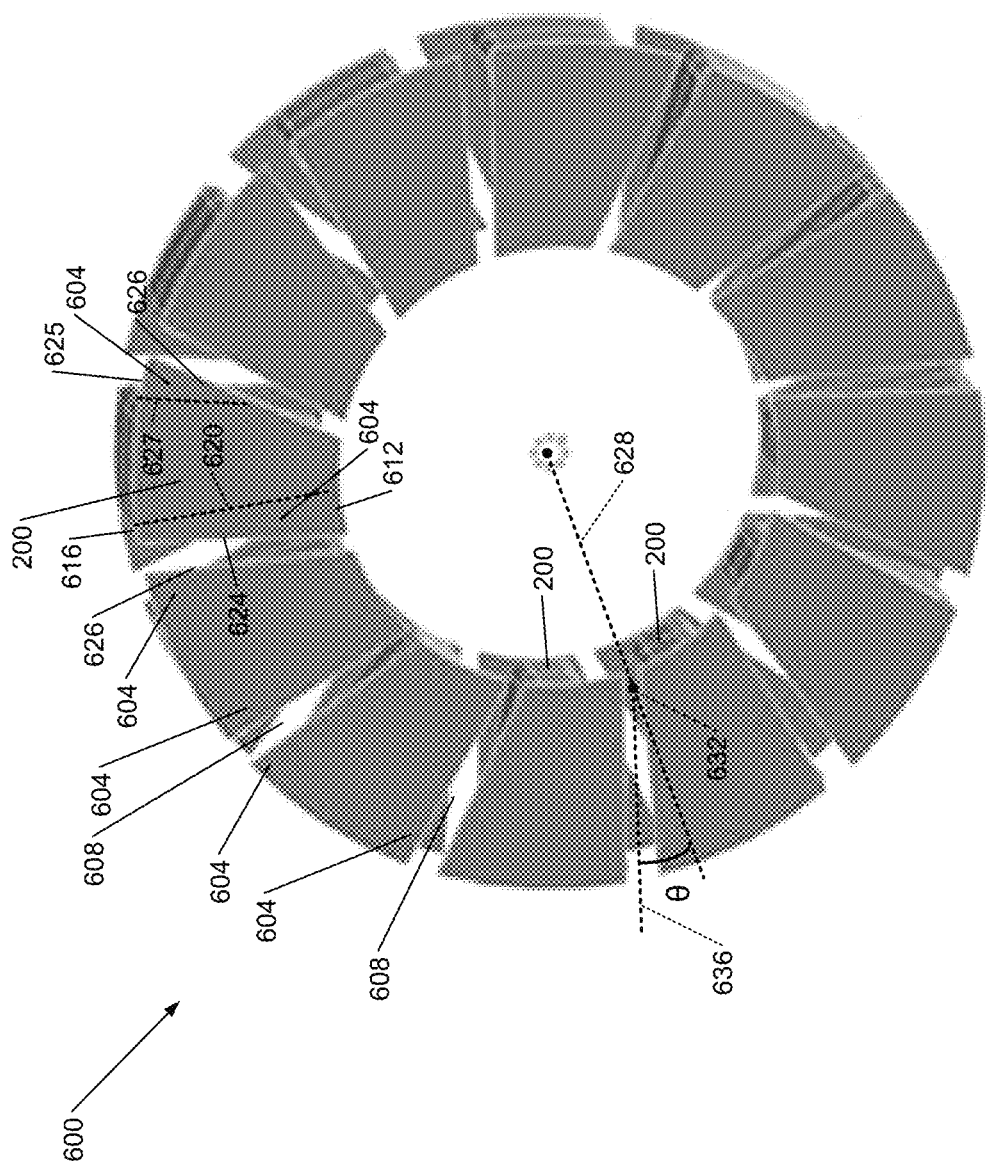
FIGS. 6 and 7 are perspective views of a stator from the first side of the stator.

FIG. 6 is a perspective view of a stator 600 from the first side 142 of the stator 600. The stator 600 includes pole shoes 604 and slot openings 608 between the pole shoes 604. The pole shoes 604 may be identical and are equally spaced around the stator 600. The slot openings 608 between the pole shoes 604 are therefore also identical. The terms slots, openings, and slot openings may be interchangeable as used herein.

The ones of the pole shoes 604 that are attached to left sides of the stator core components 200 (when viewed from the first side 142) may each include an inner arcuate surface 612 and an outer arcuate surface 616. These ones of the pole shoes 604 also each include a first linear surface 620 that connects first ends of the inner and outer arcuate surfaces 612 and 616 and a second linear surface 624 that connects second ends of the inner and outer arcuate surfaces 612 and 616. The ones of the pole shoes 604 that are attached to right sides of the stator core components 200 (when viewed from the first side 142) may each include an outer arcuate surface 625, a first linear surface 626, and a second linear surface 627.

In the example of FIG. 6, the slot openings 608 extend non-radially. The slot openings 608 extend linearly at a non-zero angle with respect to all radii of the first side 142 of the stator 600, such as radius 628. The slot openings 608 form oblique angles with respect to all radii of the first side 142. Oblique angles may refer to all angles that are not right (90 degree) angles or an integer multiple of a right (90 degree) angle.

Figure 7:
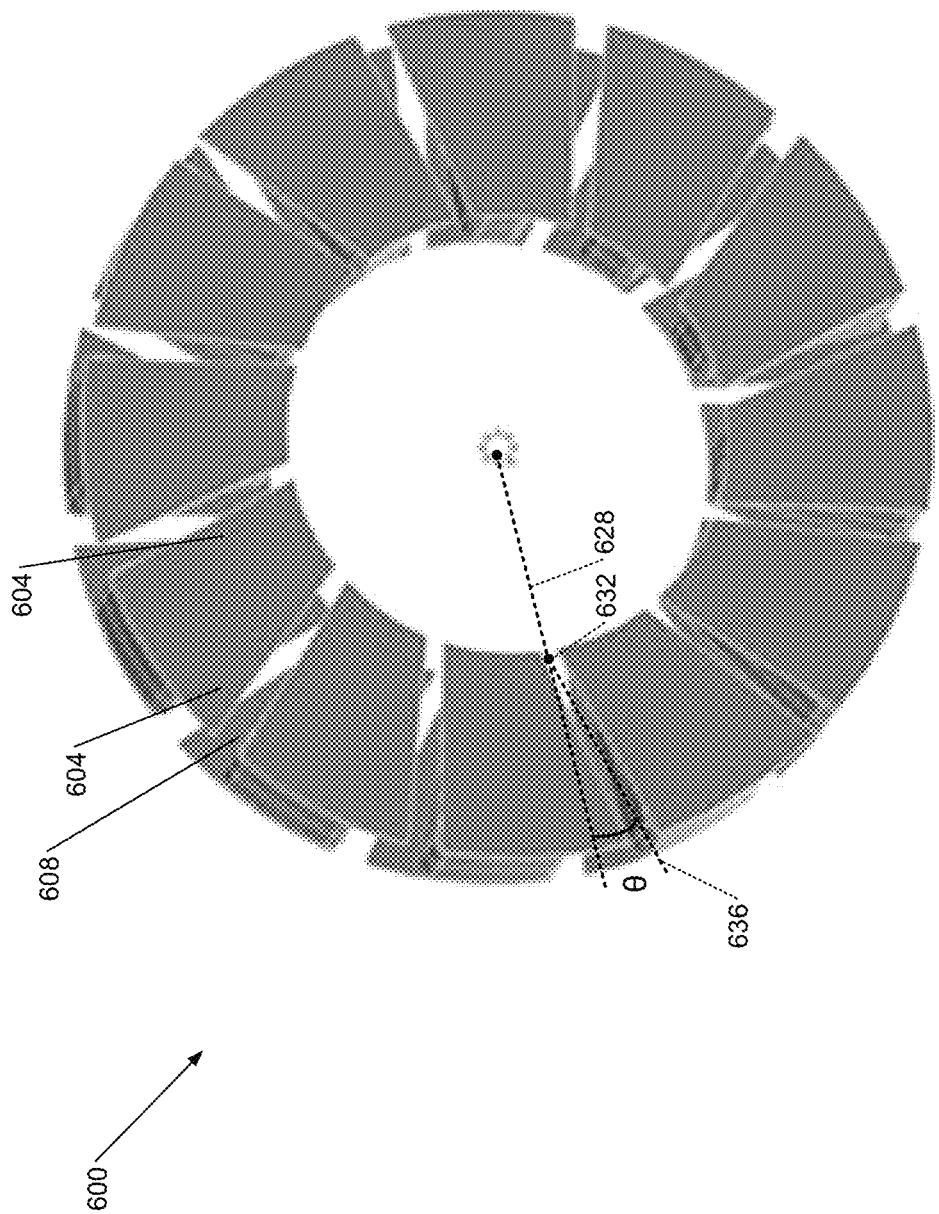

For example, the radius 628 is drawn between the center of the stator 600 and a radially inner midpoint 632 between two adjacent pole shoes 604. The line 636 along which the slot opening 608 extends forms a predetermined angle θ relative to the radius 628. The predetermined angle may be, for example, 3-15 degrees or another suitable angle. Each of the slot openings 608 forms the same predetermined angle θ relative to the radius between the center of the stator 600 and the radially inner midpoint between the two adjacent pole shoes 604 forming that slot opening. While the example of FIG. 6 the line 636 being the predetermined angle counter clockwise from the radius 628, the slot openings 608 may be oriented such that the line 636 is the predetermined angle clockwise from the radius 628, such as shown in the example of FIG. 7. The predetermined angle may be selected, for example, to minimize cogging torque ripple.

Figure 8:
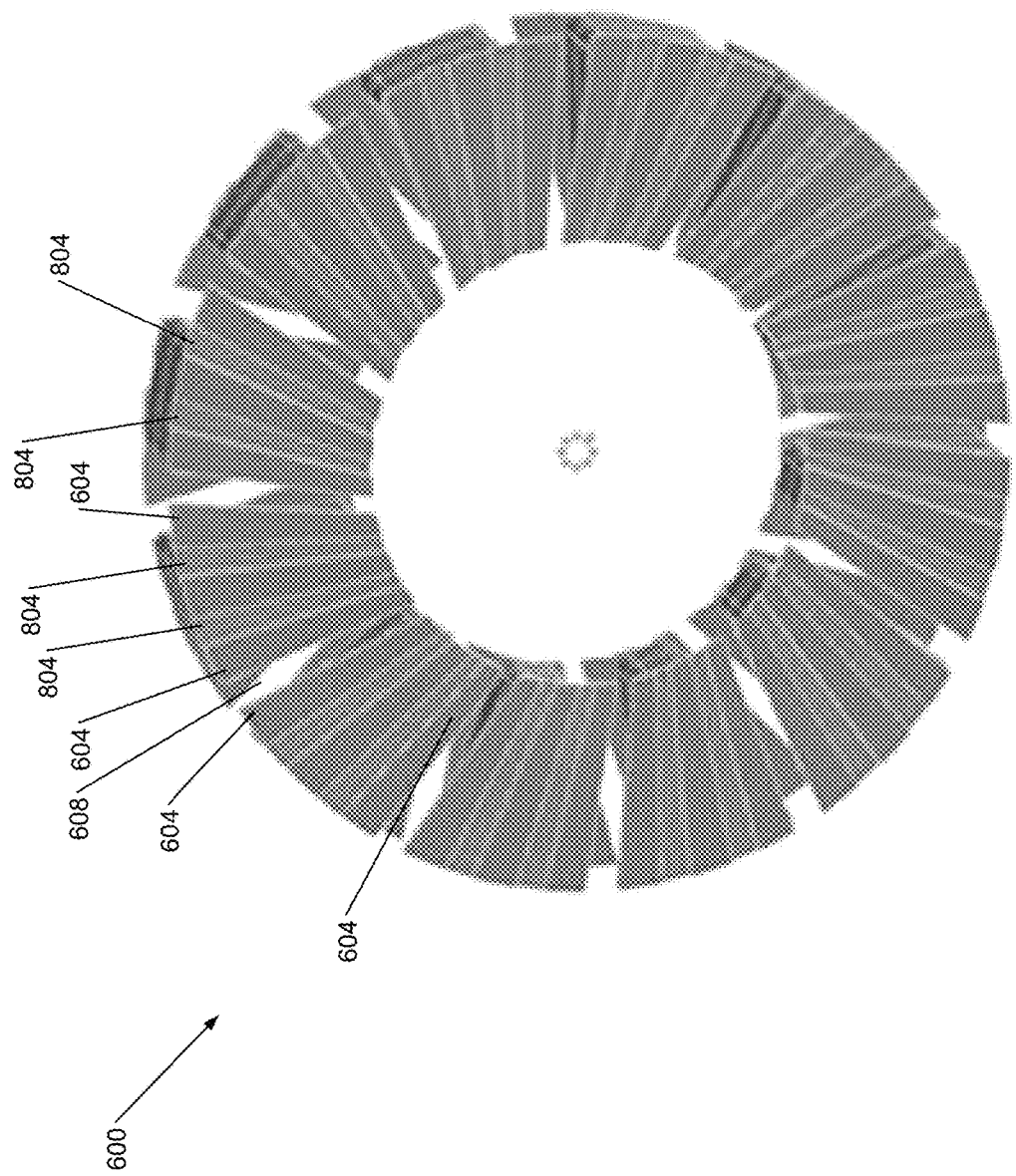
FIG. 8 is another perspective view of the stator from the first side of the stator.

FIG. 8 is another perspective view of the stator 600 from the first side 142 of the stator 600. In the example of FIG. 8, one or more recesses 804 are formed in the outer surfaces of each of the stator core component on the plane of the first side 142. While the example of two recesses being formed in each stator core component is provided, one recess or more than two recesses may alternatively be formed in each stator core component. In various implementations, the recesses may be formed during the pressing of the stator core component or removed from the stator core component after manufacturing. In various implementations, the recesses may be filled with a different material, such as a non-magnetic material, or left unfilled. The number of recesses and the dimensions of the recess(es) may be selected, for example, to minimize cogging torque. The recesses form quasi (dummy) slots.

Figure 9:
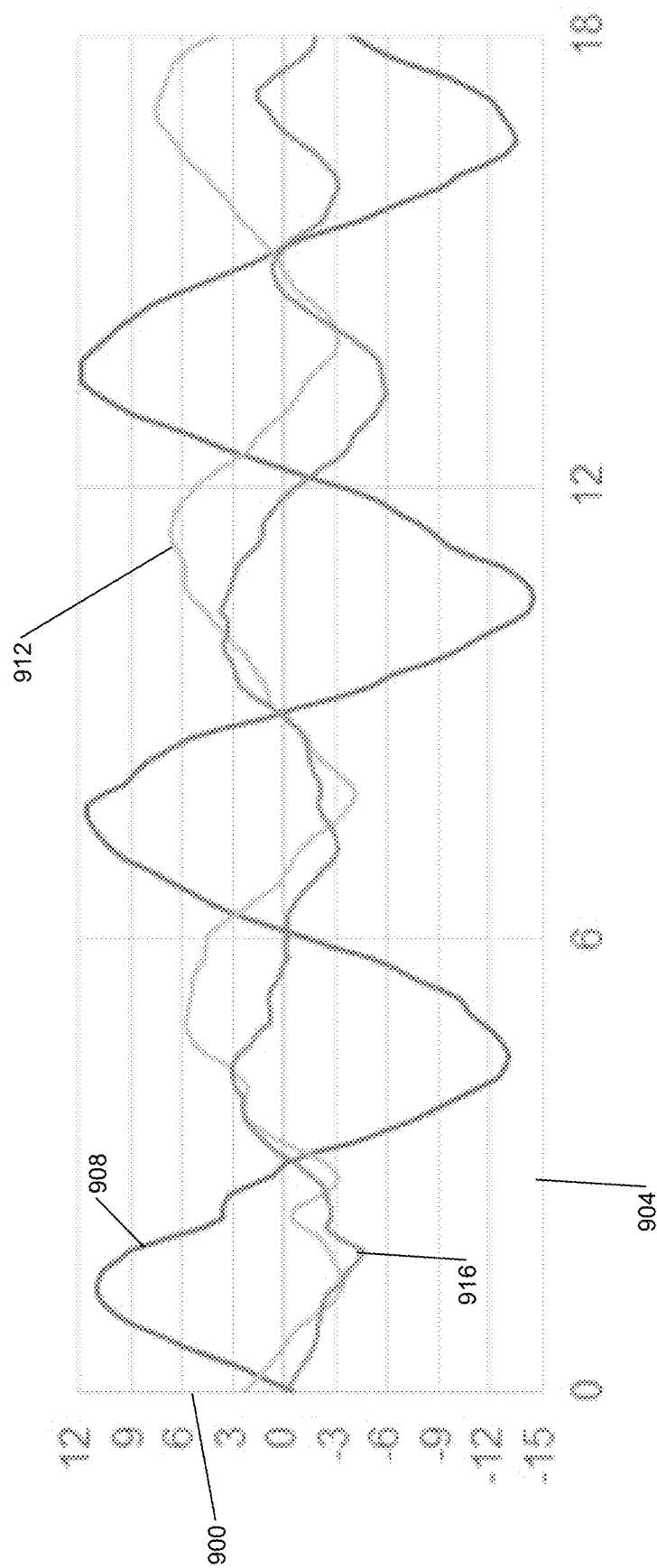
FIG. 9 is an example graph of cogging torque versus rotor position during rotation of a rotor.

FIG. 9 is an example graph of cogging torque (in Nm) 900 versus rotor position 904 during rotation of a rotor. Trace 908 is generated based on a motor having stator core components and pole shoes similar to that of FIG. 3. Trace 912 corresponds to a motor having stator core components, pole shoes, and slot openings similar to that of FIGS. 6 and 7. Trace 916 corresponds to a motor having stator core components, pole shoes, and slot openings similar to that of FIG. 8 (including recesses formed in the stator core components). As shown in FIG. 9, the examples of FIGS. 6 and 7 may reduce cogging torque ripple relative to the example of FIG. 3. The example of FIG. 8 may reduce cogging torque ripple relative to the examples of FIGS. 6 and 7.

Figure 10:
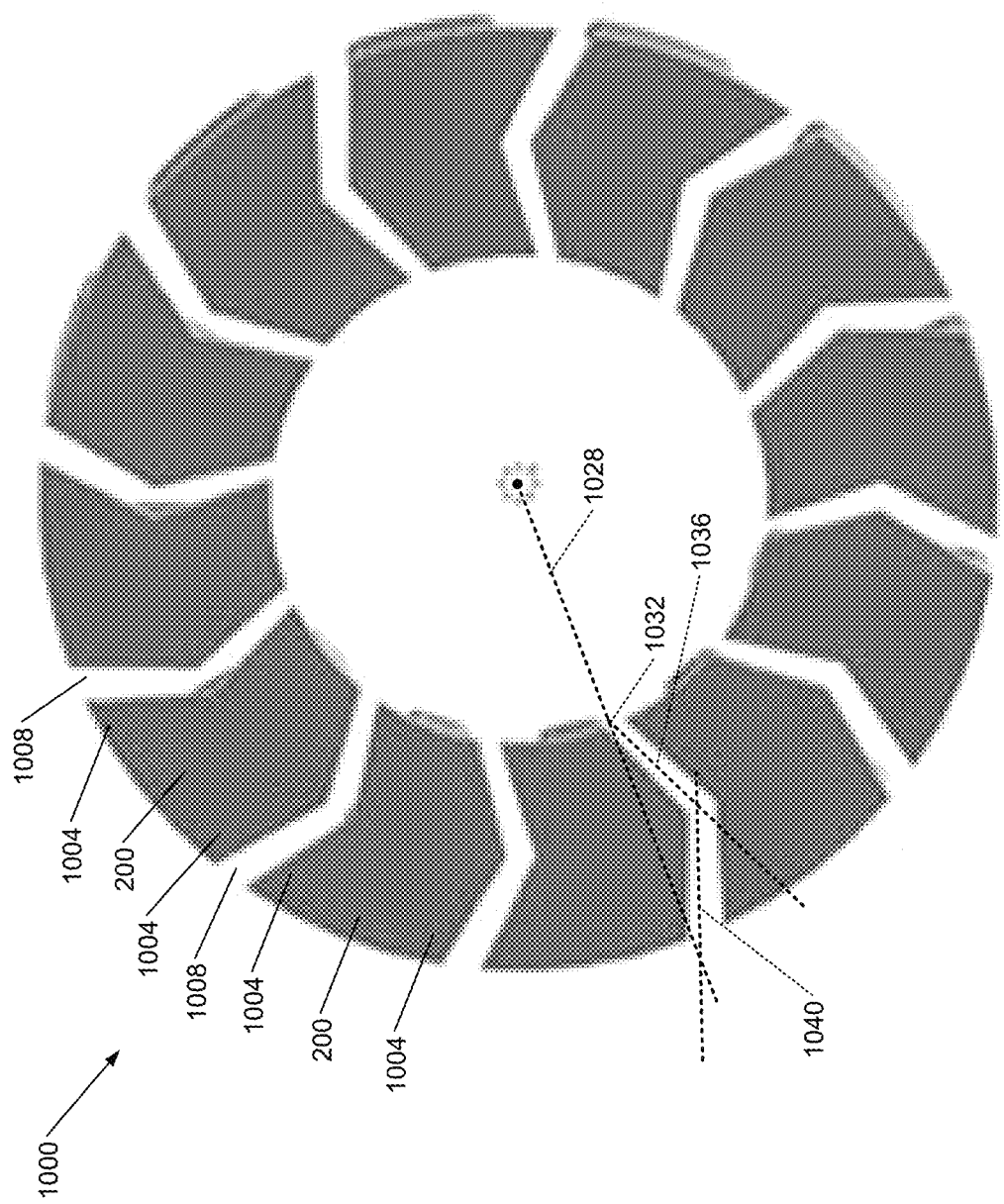
FIGS. 10, 11, 12, and 13 include perspective views of a stator.
Figure 11:
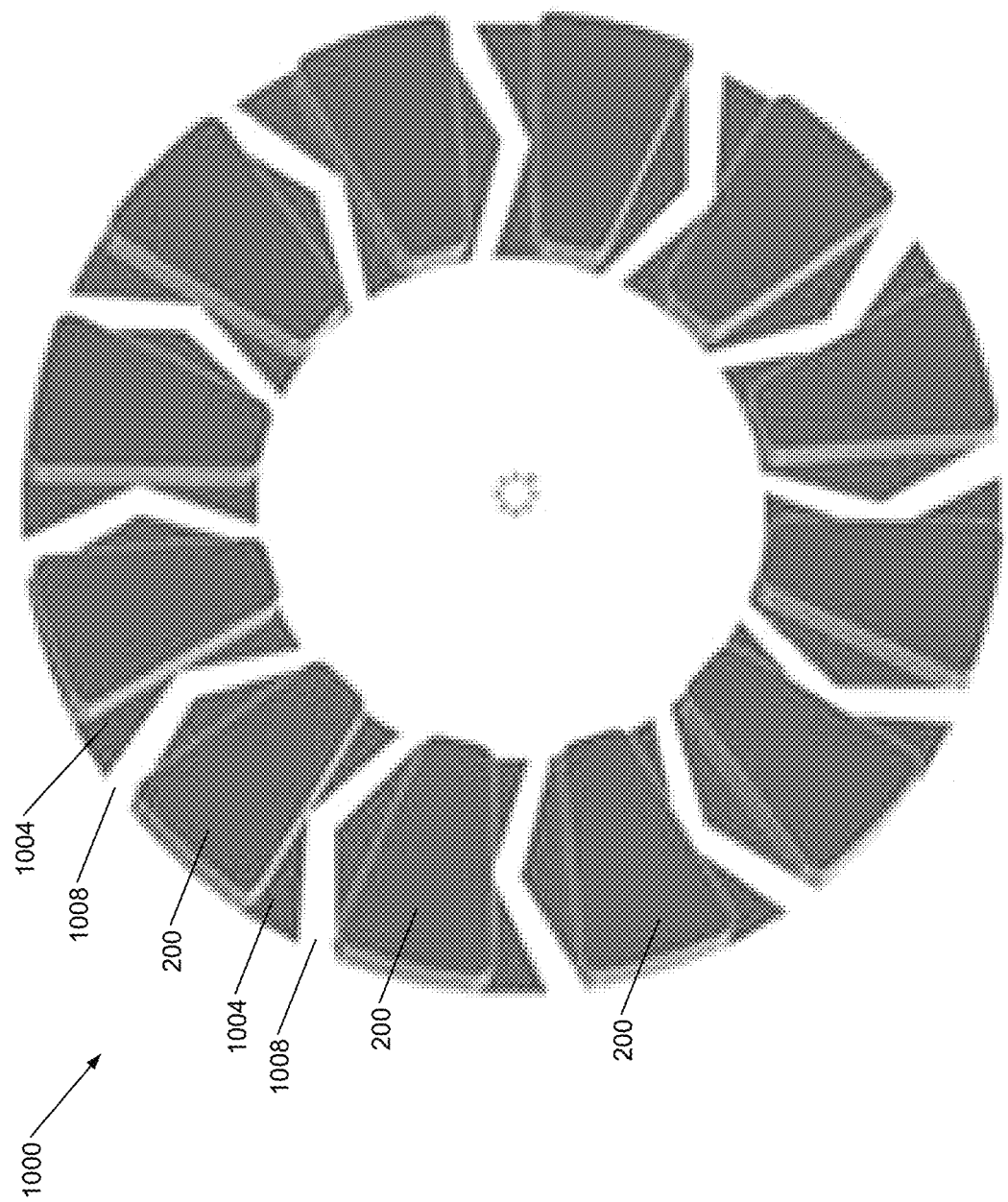
Figure 12:
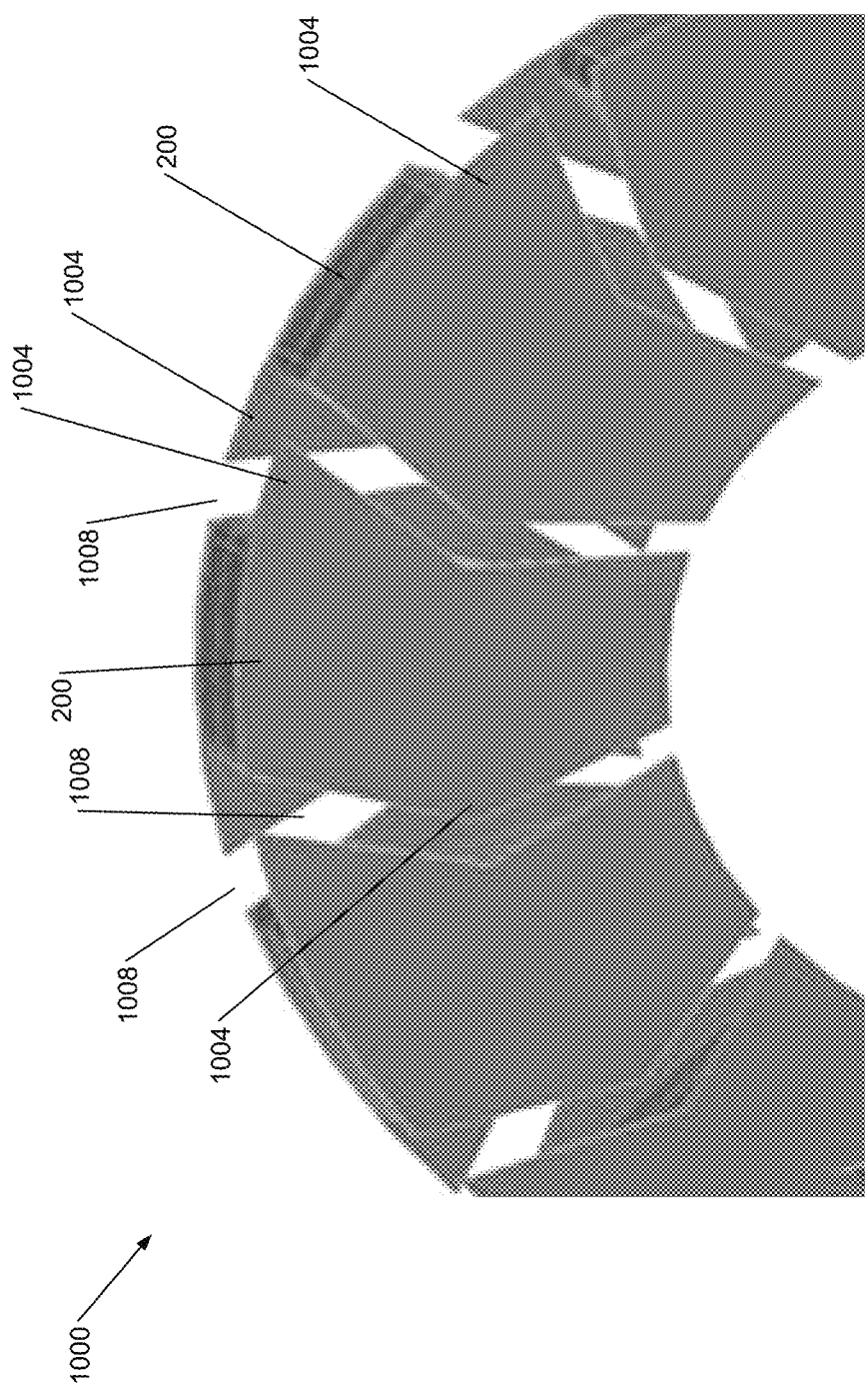

FIGS. 10, 11, and 12 include perspective views of a stator 1000. FIG. 10 includes a perspective view of the stator 1000 from the first side 142 of the stator 1000. Only a portion of the stator 1000 is shown in FIG. 12 from the first side 142. FIG. 11 is a cross-sectional view of stator 1000, cut from the mid-plane, and viewed in the same perspective as that of FIG. 10. In other words, FIG. 11 is the other half of the stator 1000 into the page in a picture, other than that shown in FIG. 10.

The stator 600 includes pole shoes 1004 and slot openings 1008 between the pole shoes 1004. Each of the pole shoes 1004 attached to the left sides of the stator core components 200 may be identical. Each of the pole shoes 1004 attached to the right sides of the stator core components 200 may be identical. The slot openings 1008 between the pole shoes 1004 are therefore also identical. In the example of FIGS. 10-12, the slot openings 1008 are V-shaped and extend in two non-radial directions relative to their respective sides of the stator 1000. As illustrated in FIG. 12, the pole shoes 1004 and the slot openings 1008 on the second side 146 of the stator 1000 may be identical to the pole shoes 1004 and the slot openings 1008 located on the first side 142 of the stator 1000 when flipped over.

In the example of FIGS. 10-12, the slot openings 1008 extend two directions non-radially. The slot openings 1008 extend linearly at a non-zero angle with respect to all radii of the first side 142 of the stator 1000, such as radius 1028. For example, the radius 1028 is drawn between the center of the stator 1000 and a radially inner midpoint 1032 between two adjacent pole shoes 1004. The slot opening 1008 extends along a first line 1036 that forms a (non-zero) first predetermined angle relative to the radius 1028. The first line 1036 also forms a non-zero angle relative to all other radii of the first side 142. The predetermined angle is an oblique angle. The slot opening 1008 also extends along a second line 1040. The second line 1040 forms a (non-zero) second predetermined angle relative to the radius 1028. The second line 1040 also forms a non-zero angle relative to all other radii of the first side 142.

Figure 13:
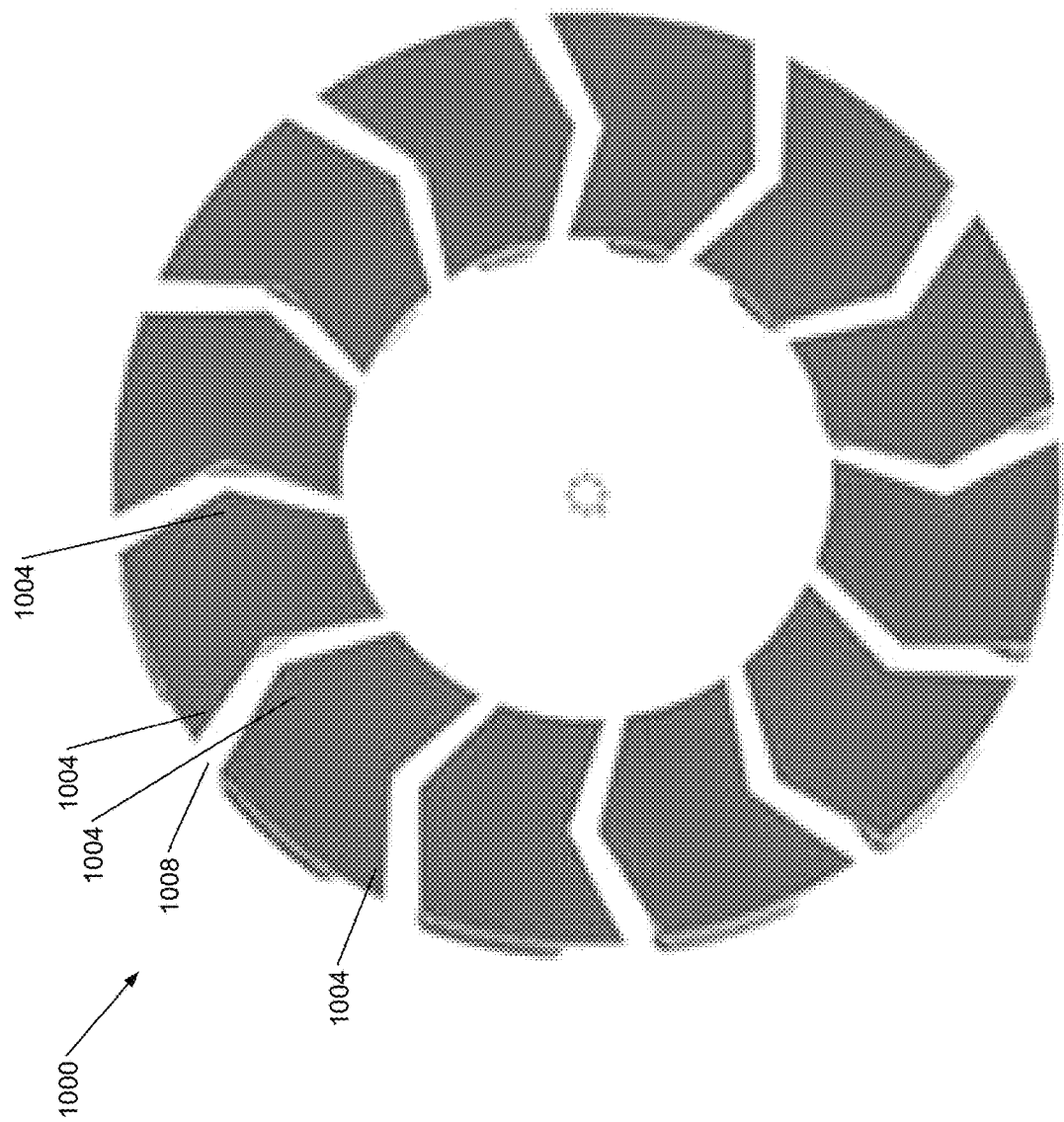

Each of the slot openings 1008 forms the same angles relative to a radius between the center of the stator 1000 and the radially inner midpoint between the two adjacent pole shoes 1004 forming that slot. While the example of FIG. 10 illustrates the first line 1036 being counter clockwise from the radius 1028, the slot openings 1008 may be oriented such that the first line 1036 is clockwise from the radius 1028, such as shown in the example of FIG. 13. In other words, the pole shoes 1004 of the example of FIG. 10 may be flipped horizontally, as illustrated in FIG. 13.

Figure 14:
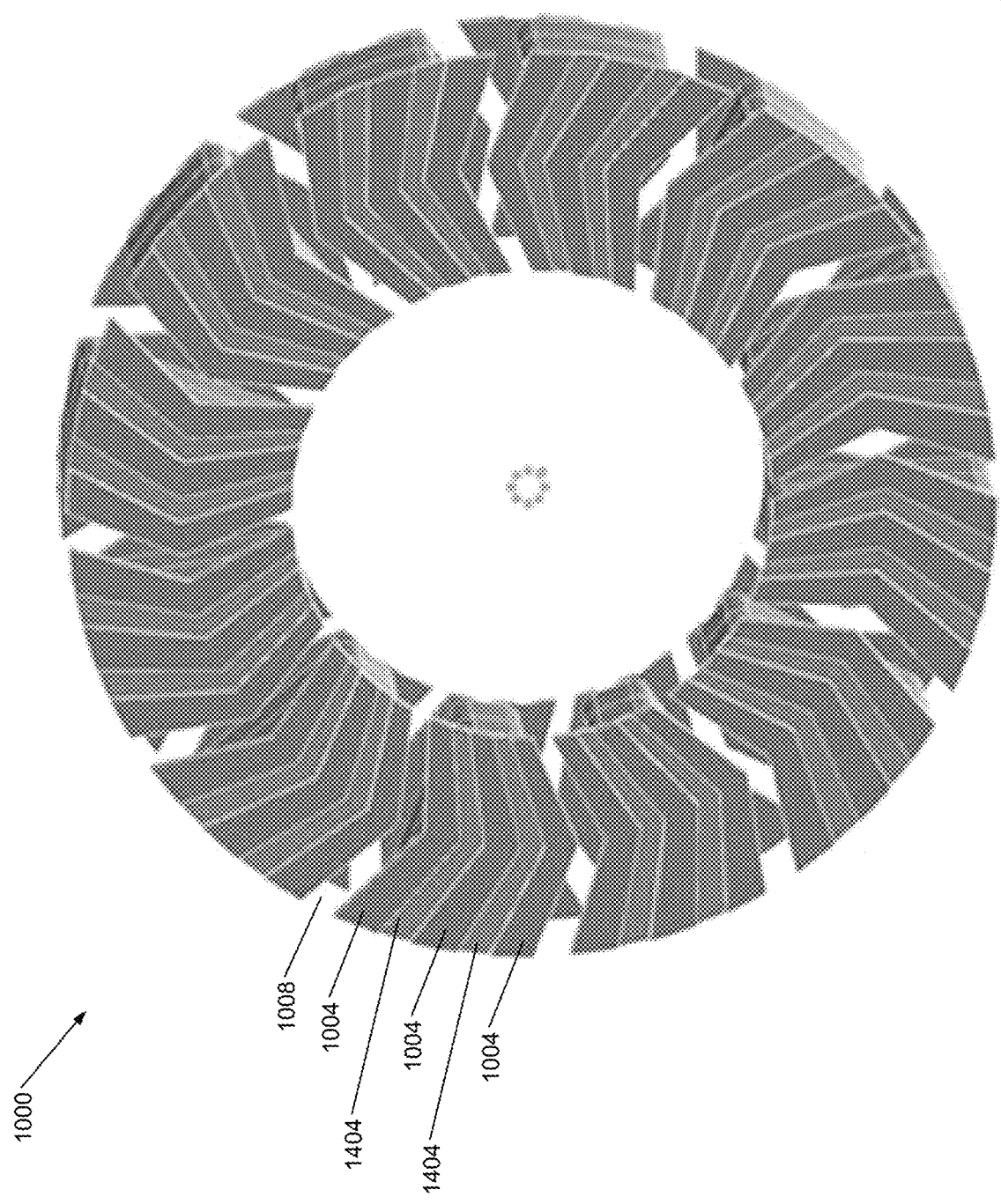
FIG. 14 is another perspective view of the stator from the first side of the stator.

FIG. 14 is another perspective view of the stator 1000 from the first side 142 of the stator 1000. In the example of FIG. 14, one or more recesses 1404 are formed in the outer surfaces of each of the stator core components 200 on the plane of the first side 142. While the example of two recesses being formed in each stator core component is provided, one recess or more than two recesses may alternatively be formed in each stator core component. In various implementations, the recesses may be formed during the pressing of the stator core components or removed from the stator core components after manufacturing. In various implementations, the recesses may be filled with a different material, such as a non-magnetic material, or left unfilled. The number of recesses and the dimensions of the recess(es) may be selected, for example, to minimize cogging torque. The recesses form quasi (dummy) slots.

FIG. 15 includes example graphs of cogging torque (in Nm) 1500 versus rotor position 1504 during rotation of a rotor. Trace 1508 is generated based on a motor having stator core components and pole shoes similar to that of FIG. 3. Trace 1512 corresponds to a motor having stator core components, pole shoes, and slot openings similar to that of FIGS. 10-12. Trace 1516 corresponds to a motor having stator core components (with recesses), pole shoes, and slots similar to that of FIG. 13. As shown in FIG. 15, the examples of FIGS. 10-13 may reduce cogging torque ripple relative to the example of FIG. 3. The example of FIG. 14 may also reduce cogging torque ripple relative to the example of FIGS. 10-13.

The permanent magnets 112 on the rotor(s) may have the shape shown in the example of FIG. 1. As an alternative to or in addition to the slot openings extending in one or more directions non-radially, the permanent magnets 112 on the rotor(s) may have a different shape.

Figure 16:
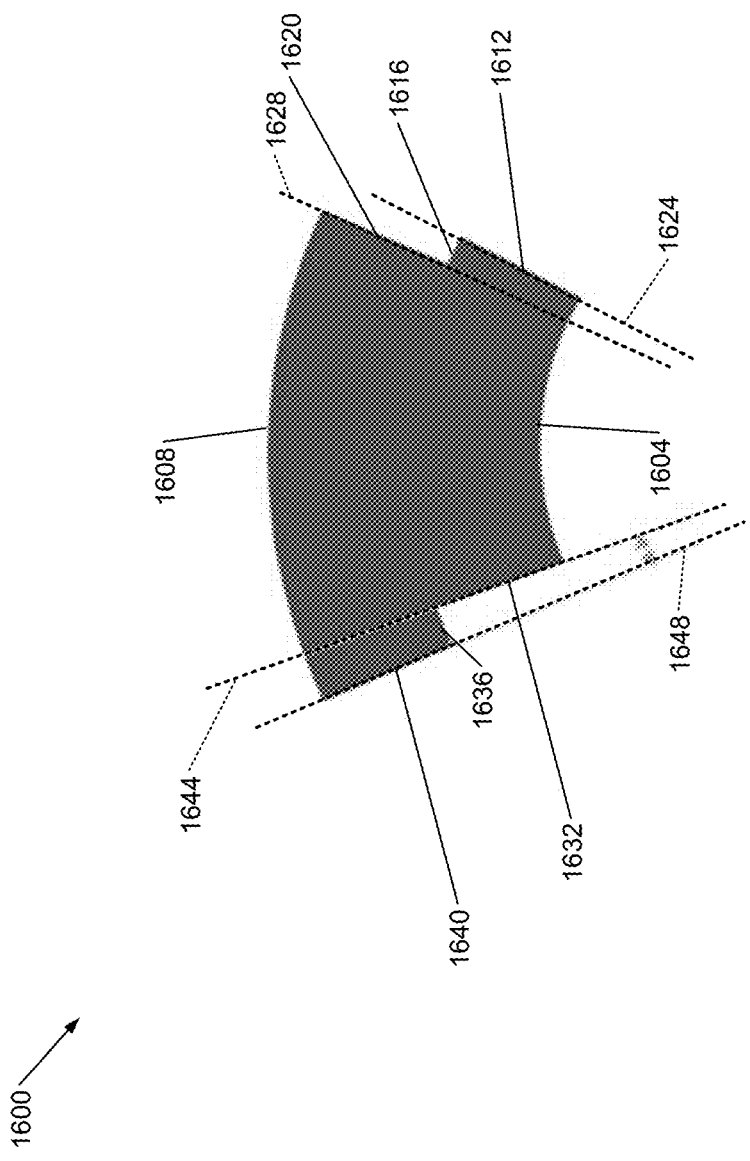

FIG. 16 includes a perspective view of a permanent magnet 1600 of a rotor having a different shape than the permanent magnets 112 of FIG. 1. All of the permanent magnets on the motor may have the same shape.

The permanent magnet 1600 includes an inner arcuate surface 1604 and an outer arcuate surface 1608. The inner arcuate surface 1604 is located radially inwardly from the outer actuate surface 1608 on the rotor.

A first end of the inner arcuate surface 1604 is connected to a first end of the outer arcuate surface via first, second, and third surfaces 1612, 1616, and 1620. The first and third surfaces 1612 and 1620 may be linear. The second surface 1616 may be perpendicular to both of the first and third surfaces 1612 and 1620. While the second surface 1616 may be linear or arcuate. The second surface 1616 may form angles other than 90 degrees with the first and third surfaces 1612 and 1620. With this arrangement, the first surface 1612 is aligned with a first radius 1624 of the rotor, the third surface 1620 is aligned with a second radius 1628 of the rotor, and the first radius 1624 is different than (angularly offset from) the second radius 1628.

A second end of the inner arcuate surface 1604 is connected to a second end of the outer arcuate surface via fourth, fifth, and sixth surfaces 1632, 1636, and 1640. The fourth and sixth surfaces 1632 and 1640 may be linear. The fifth surface 1636 may be linear or arcuate. The fifth surface 1636 may be perpendicular to both of the fourth and sixth surfaces 1632 and 1640. However, the fifth surface 1636 may form angles other than 90 degrees with the fourth and sixth surfaces 1632 and 1640. With this arrangement, the fourth surface 1632 is aligned with a third radius 1644 of the rotor, the sixth surface 1640 is aligned with a fourth radius 1648 of the rotor, and the third radius 1644 is different than (angularly offset from) the fourth radius 1648.

FIG. 17 includes a perspective view of a permanent magnet 1700 of a rotor having a different shape than the permanent magnets 112 of FIG. 1. All of the permanent magnets on the motor may have the same shape.

The permanent magnet 1700 includes an inner arcuate surface 1704 and an outer arcuate surface 1708. The inner arcuate surface 1704 is located radially inwardly from the outer actuate surface 1708 on the rotor.

A first end of the inner arcuate surface 1704 is connected to a first end of the outer arcuate surface 1708 via a first linear surfaces 1712. While the example of the first linear surface 1712 is provided, the first surface 1712 may be non-linear. A second end of the inner arcuate surface 1704 is connected to a second end of the outer arcuate surface 1708 via a second linear surface 1716. While the example of the second linear surface 1716 is provided, the first surface 1716 may be non-linear. The first linear surface 1712 extends along a first line 1720 and non-radially relative to the rotor. In other words, the first linear surface 1712 forms a non-zero angle with respect to all radii of the rotor. The second linear surface 1716 extends along a second line 1724 and non-radially relative to the rotor. In other words, the second linear surface 1716 forms a non-zero angle with respect to all radii of the rotor.

Example radii 1728 and 1732 are provided in FIG. 17 and intersect at the (radial) center 1736 of the rotor. Because the first and second lines 1720 and 1724 extend non-radially, the first and second lines 1720 and 1724 intersect at a location other than the center 1736 of the rotor. The permanent magnets having the shape of the example of FIG. 16 or the example of FIG. 17 may reduce cogging torque of the motor.

Figure 18A:
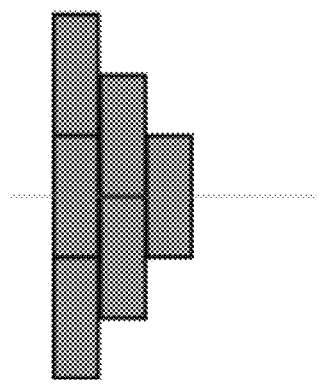
FIGS. 18A and B include example illustrations of rectangular permanent magnet blocks that can be used to form permanent magnets of a rotor.
Figure 18B:
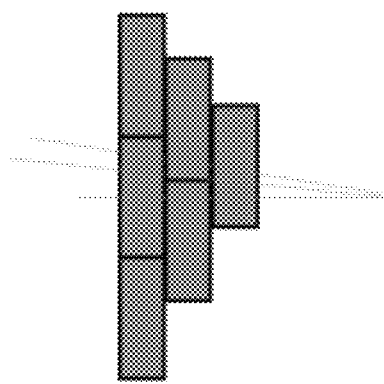

While examples of arcuate shaped permanent magnets are provided, the permanent magnets may be formed of multiple rectangular permanent magnets form the overall pattern of the arcuate surface. Multiple layers of the rectangular permanent magnets may be used to create one of the permanent magnets discussed above. The rectangular permanent magnets may be skewed such that the center line of a given layer of the rectangular magnet blocks is shifted with respect to the center of the rotor. FIG. 18B provides an example of rectangular permanent magnets that could be used to form one of the permanent magnets discussed above where the center line of the layer of the rectangular magnet blocks is shifted with respect to the center of the rotor. FIG. 18A also includes rectangular permanent magnets, but the center line of the layer of the rectangular magnet blocks is not shifted with respect to the center of the rotor in FIG. 18A.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An axial flux motor comprising:
   a stator having a first side and a second side opposite the first side, the stator comprising:
   N stator core components on the first side, wherein N is an integer greater than two; and
   pole shoes attached to the N stator core components, the pole shoes each having an inner circumferential side, an outer circumferential side, and lateral sides, each of the lateral sides extending in at least two directions non-radially on the first side,
   N slot openings between adjacent ones of the pole shoes, wherein each of the N slot openings extends in at least two directions non-radially on the first side; and
   a rotor including a third side and M permanent magnets on the third side,
   wherein the first side is parallel to the third side, and
   wherein M is an integer greater than two.

2. The axial flux motor of claim 1 further comprising at least one recess formed in each of the pole shoes.

3. The axial flux motor of claim 2 wherein the at least one recess extends non-radially on the first side.

4. The axial flux motor of claim 2 wherein the at least one recess includes at least two recesses formed in each of the pole shoes.

5. The axial flux motor of claim 2 further comprising an electrically insulative material located in each of the one or more recesses formed in each of the pole shoes.

6. The axial flux rotor of claim 1 further comprising an air gap disposed between the N stator core components and the permanent magnets.

7. The axial flux motor of claim 1 further comprising electrical conductors at least one of (i) wound around the N stator core components and (ii) wound through the N stator core components.

8. The axial flux motor of claim 1 wherein the N stator core components are made of a soft magnetic composite (SMC) material.

9. The axial flux motor of claim 1 wherein the pole shoes are made of a soft magnetic composite (SMC) material.

10. The axial flux motor of claim 1 wherein the pole shoes are adhered to the N stator core components, respectively, via at least one of an adhesive and powder metallurgy forming.

11. The axial flux motor of claim 1 wherein each of the M permanent magnets includes;
    a first arcuate surface;
    a second arcuate surface that is located radially outwardly of the first arcuate surface; and
    at least one of:

a third side surface that connects first ends of the first and second arcuate surfaces and that extends in at least one direction non-radially on the third side of the rotor; and a fourth side surface that connects second ends of the first and second arcuate surfaces and that extends in at least one direction non-radially on the third side of the rotor.

12. The axial flux motor of claim 11 wherein each of the M permanent magnets includes both:

the third side surface that connects the first ends of the first and second arcuate surfaces and that extends in at least one direction non-radially on the third side of the rotor; and the fourth side surface that connects the second ends of the first and second arcuate surfaces and that extends in at least one direction non-radially on the third side of the rotor.

13. The axial flux motor of claim 1 wherein each of the M permanent magnets includes:

a first arcuate surface;

a second arcuate surface that is located radially outwardly of the first arcuate surface;

a third side surface that extends radially outwardly from a first end of the first arcuate surface in a first direction;

a fourth side surface that extends radially outwardly in a second direction to a first end of the second arcuate surface;

a fifth side surface that connects the third side surface and the fourth side surface;

a sixth side surface that extends radially outwardly from a second end of the first arcuate surface in a third direction;

a seventh side surface that extends radially outwardly in a fourth direction to a second end of the second arcuate surface; and an eighth side surface that connects the sixth side surface and the seventh side surface, wherein the first, second, third, and fourth directions are different from each other.

14. The axial flux motor of claim 13 wherein the fifth side surface is perpendicular to both the third and fourth side surfaces.

15. The axial flux motor of claim 13 wherein the eighth side surface is perpendicular to both the sixth and seventh side surfaces.

16. The axial flux motor of claim 13 wherein:

the fifth side surface forms an oblique angle with the third and fourth side surfaces; and the eighth side surface forms an oblique angle with the sixth and seventh side surfaces.

17. An axial flux motor comprising:

a stator having a first side and a second side opposite the first side, the stator comprising:

N stator core components on the first side, wherein N is an integer greater than two; and pole shoes attached to the N stator core components, the pole shoes each having an inner circumferential side, an outer circumferential side, and lateral sides, each of the lateral sides extending in at least two directions non-radially on the first side;

N slot openings between adjacent ones of the pole shoes; and a rotor including a third side and M permanent magnets on the third side, wherein the first side is parallel to the third side, and wherein M is an integer greater than two, and wherein each of the M permanent magnets includes:

a first arcuate surface;

a second arcuate surface that is located radially outwardly of the first arcuate surface; and at least one of:

a third side surface that connects first ends of the first and second arcuate surfaces and that extends in at least one direction non-radially on the third side of the rotor; and a fourth side surface that connects second ends of the first and second arcuate surfaces and that extends in at least one direction non-radially on the third side of the rotor.

18. The axial flux motor of claim 17 wherein each of the M permanent magnets includes both:

the third side surface that connects the first ends of the first and second arcuate surfaces and that extends in at least one direction non-radially on the third side of the rotor; and the fourth side surface that connects the second ends of the first and second arcuate surfaces and that extends in at least one direction non-radially on the third side of the rotor.

19. An axial flux motor comprising:

a stator having a first side and a second side opposite the first side, the stator comprising:

N stator core components on the first side, wherein N is an integer greater than two; and pole shoes attached to the N stator core components, the pole shoes each having an inner circumferential side, an outer circumferential side, and lateral sides, each of the lateral sides extending in at least two directions non-radially on the first side;

N slot openings between adjacent ones of the pole shoes; and a rotor including a third side and M permanent magnets on the third side, wherein the first side is parallel to the third side, and wherein M is an integer greater than two, and wherein each of the M permanent magnets includes:

a first arcuate surface;

a second arcuate surface that is located radially outwardly of the first arcuate surface;

a third side surface that extends radially outwardly from a first end of the first arcuate surface in a first direction;

a fourth side surface that extends radially outwardly in a second direction to a first end of the second arcuate surface;

a fifth surface that connects the third side surface and the fourth side surface;

a sixth side surface that extends radially outwardly from a second end of the first arcuate surface in a third direction;

a seventh side surface that extends radially outwardly in a fourth direction to a second end of the second arcuate surface; and an eighth surface that connects the sixth side surface and the seventh side surface, wherein the first, second, third, and fourth directions are different from each other.

* * * * *